United States Patent
Iwaizono et al.

(10) Patent No.: US 6,881,371 B2
(45) Date of Patent: Apr. 19, 2005

(54) METHOD FOR FORMING OUTER PACKAGING BODY OF PRODUCT

(75) Inventors: Yoshinori Iwaizono, Okayama (JP); Shoji Konishi, Kyoto (JP); Takeshi Ishimaru, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 56 days.

(21) Appl. No.: 10/362,690

(22) PCT Filed: Oct. 19, 2001

(86) PCT No.: PCT/JP01/09226
§ 371 (c)(1),
(2), (4) Date: Mar. 5, 2003

(87) PCT Pub. No.: WO02/33766
PCT Pub. Date: Apr. 25, 2002

(65) Prior Publication Data
US 2003/0173709 A1 Sep. 18, 2003

(30) Foreign Application Priority Data
Oct. 20, 2000 (JP) .......... 2000-320166
Nov. 29, 2000 (JP) .......... 2000-363518

(51) Int. Cl.[7] .......... B29C 45/14; B29C 70/72
(52) U.S. Cl. .......... 264/261; 264/263; 264/272.15; 264/272.21; 264/275
(58) Field of Search .......... 264/259, 261, 264/263, 267, 271.1, 272.11, 272.14, 272.15, 272.17, 272.21, 275, 277; 429/121, 164; 425/571

(56) References Cited

U.S. PATENT DOCUMENTS 3,278,669 A * 10/1966 Shannon .......... 264/263
3,352,721 A * 11/1967 Felix .......... 264/279
3,420,714 A * 1/1969 Knight .......... 429/133
3,919,371 A * 11/1975 Jache .......... 264/46.6
3,986,894 A * 10/1976 Ciliberti, Jr. .......... 429/153
4,759,771 A * 7/1988 Morra .......... 29/623.1
4,989,837 A * 2/1991 Karna et al. .......... 264/261
5,500,177 A * 3/1996 Uemichi et al. .......... 264/277

FOREIGN PATENT DOCUMENTS

| | | |
|---|---|---|
| JP | 6-196874 | 7/1994 |
| JP | 11-289168 | 10/1999 |
| JP | 2000-260402 | 9/2000 |

OTHER PUBLICATIONS

English Language Abstract of JP 11-289168.
English Language Abstract of JP 6-196874.
English Language Abstract of JP 2000-260402.

* cited by examiner

Primary Examiner—Angela Ortiz
(74) Attorney, Agent, or Firm—Greenblum & Bernstein, P.L.C.

(57) ABSTRACT

An intermediate product is formed by combining together plurality of constituent elements. The intermediate product is arranged in a mold an then molten resin is charged in the mold. An opening is formed so as to correspond to a plus terminal, a minus terminal, and a temperature detecting terminal in the intermediate product, and its periphery is covered with the resin. Whereupon, a thin enclosed outer packaging body is realized that is made compact and offers excellent dust-proof, drip-proof structure. Alternatively, the intermediate product is housed in an outer packaging case having an open end that allows insertion of the intermediate product, and resin is charged in the open end, thereby achieving sealing.

12 Claims, 17 Drawing Sheets

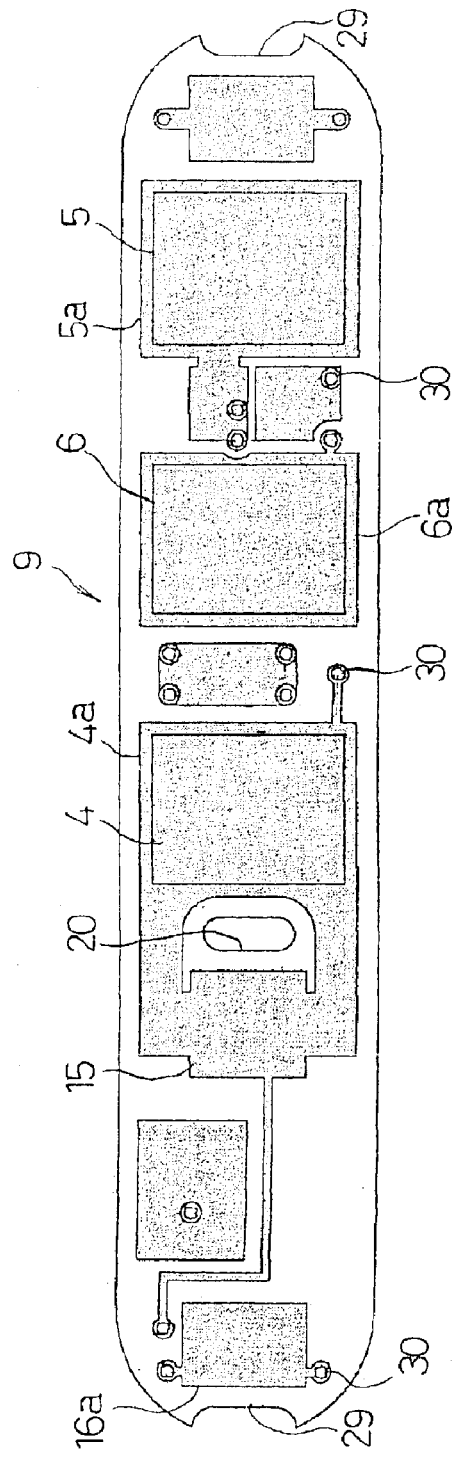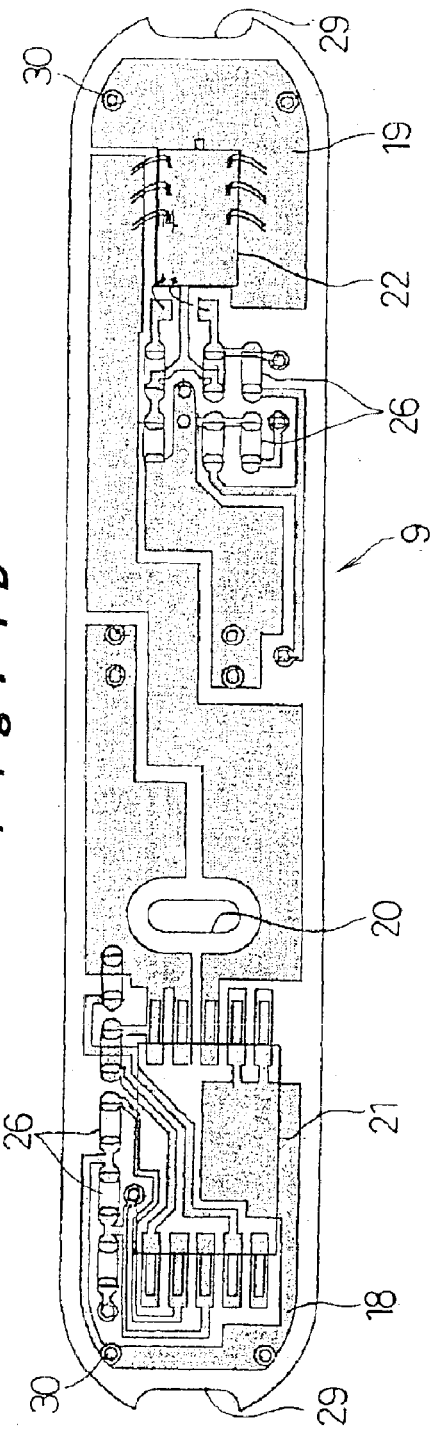

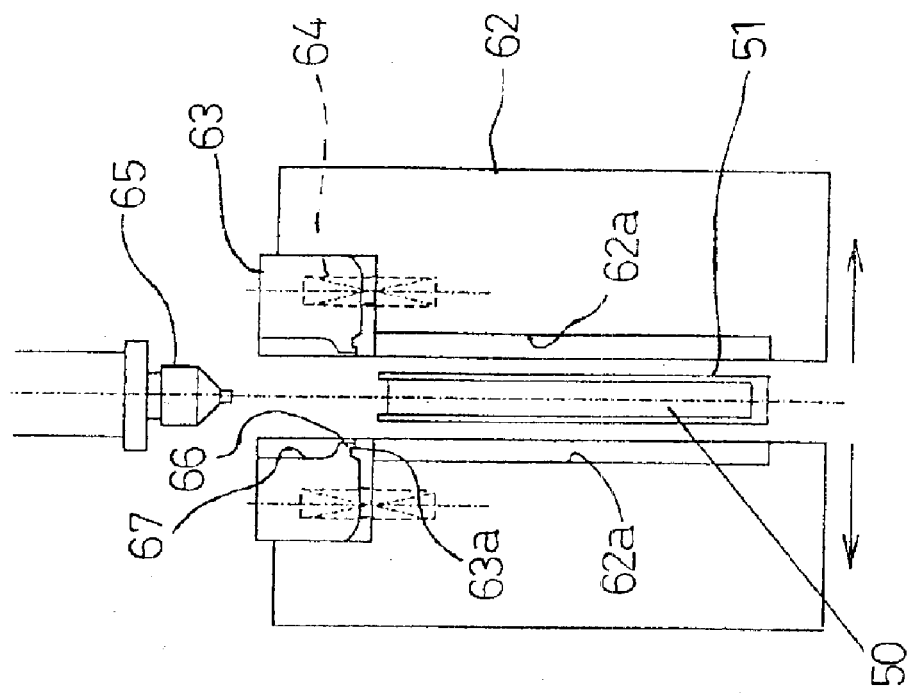
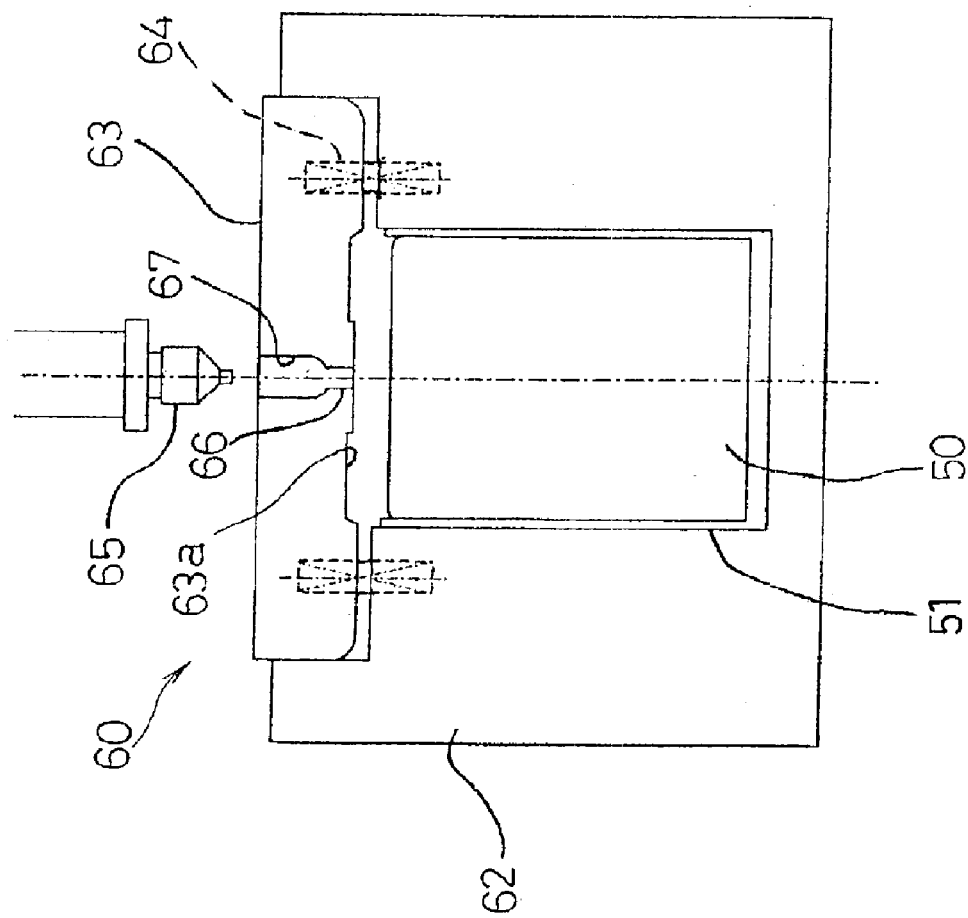
Fig. 10A
Fig. 10B

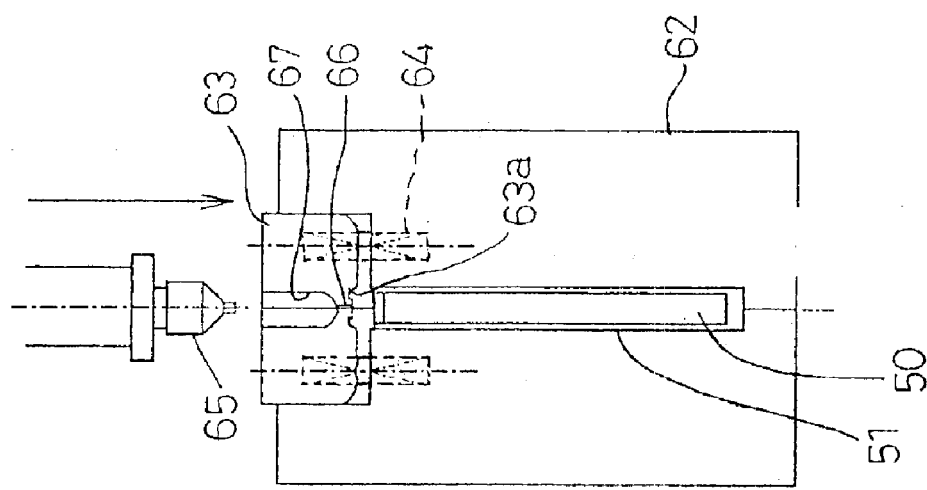
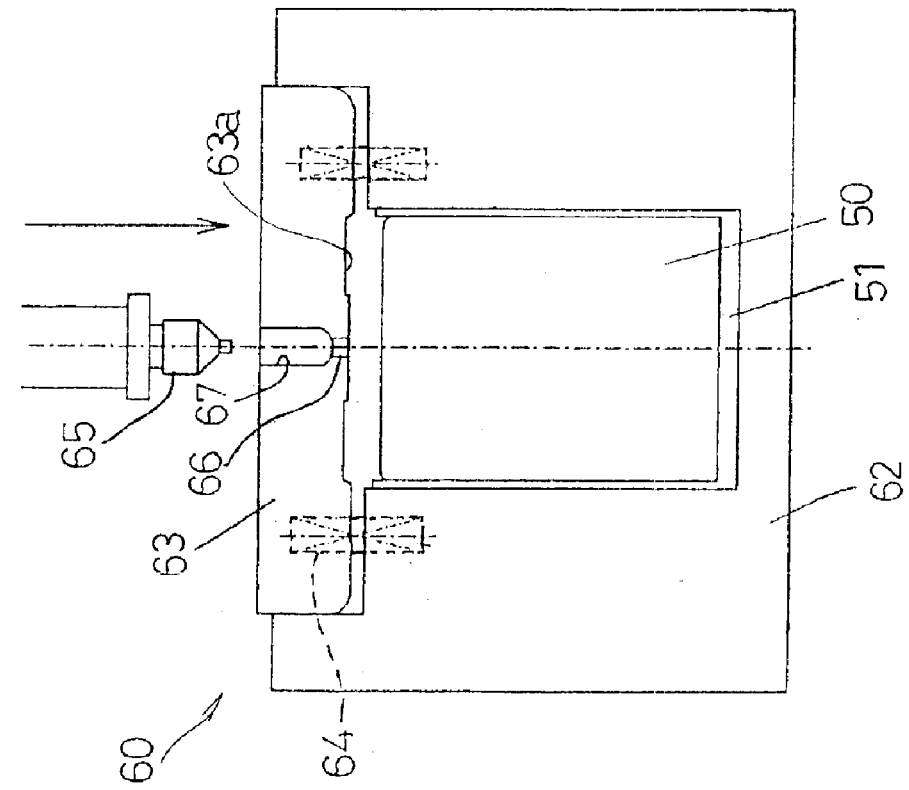

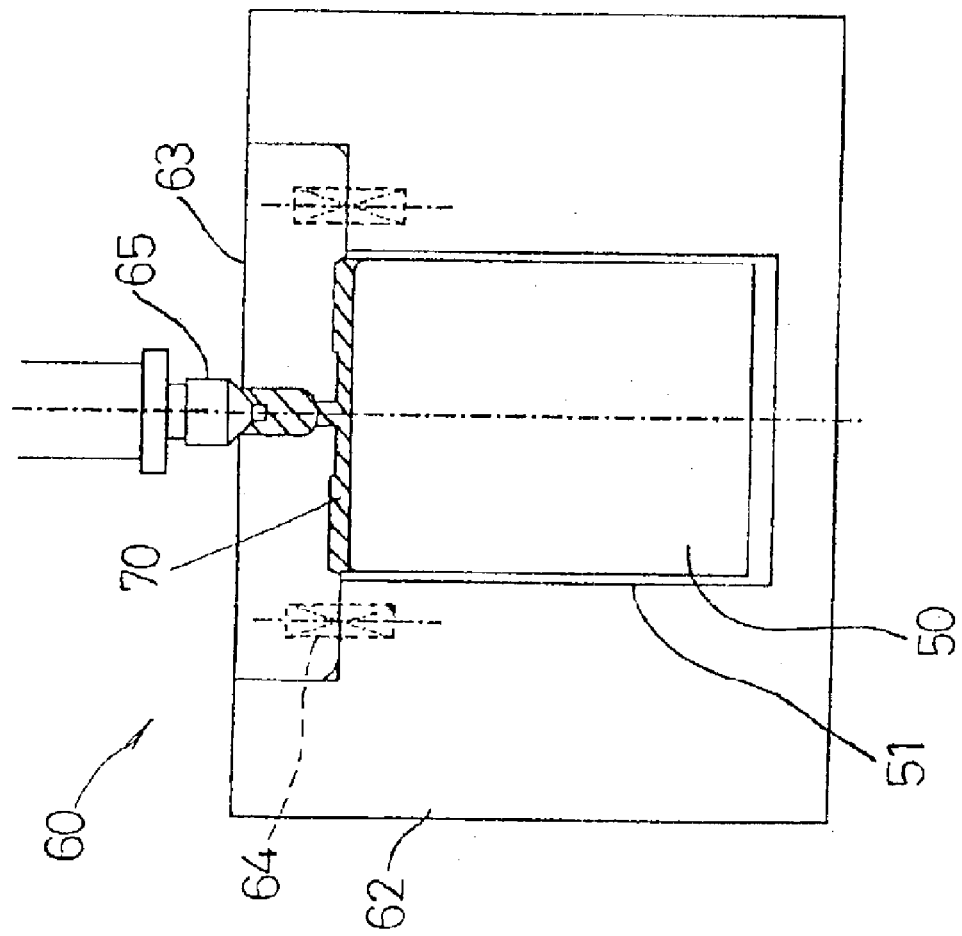

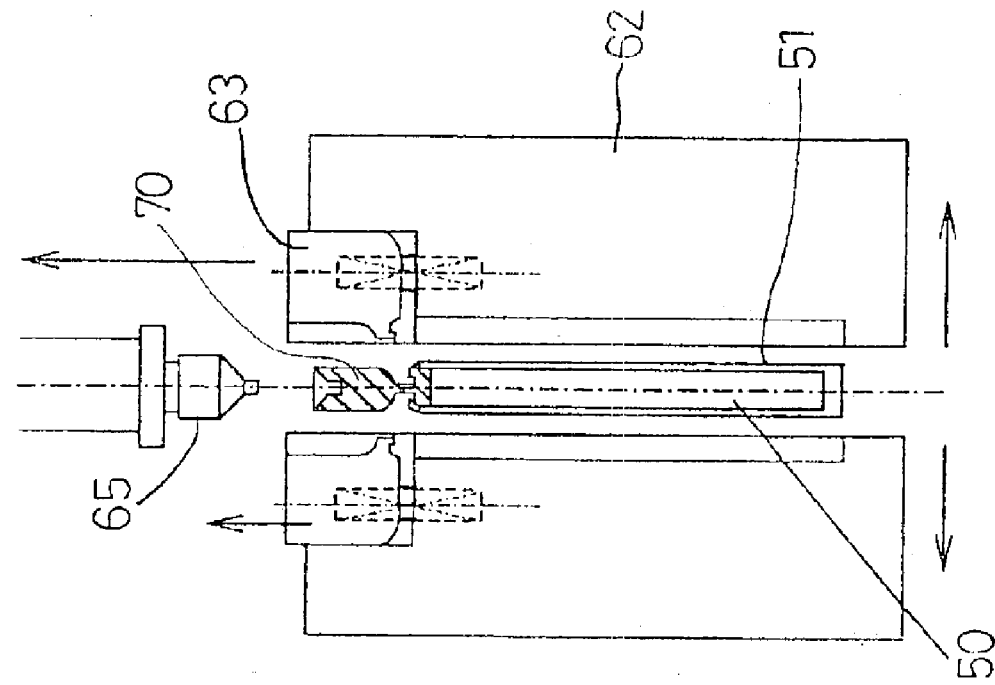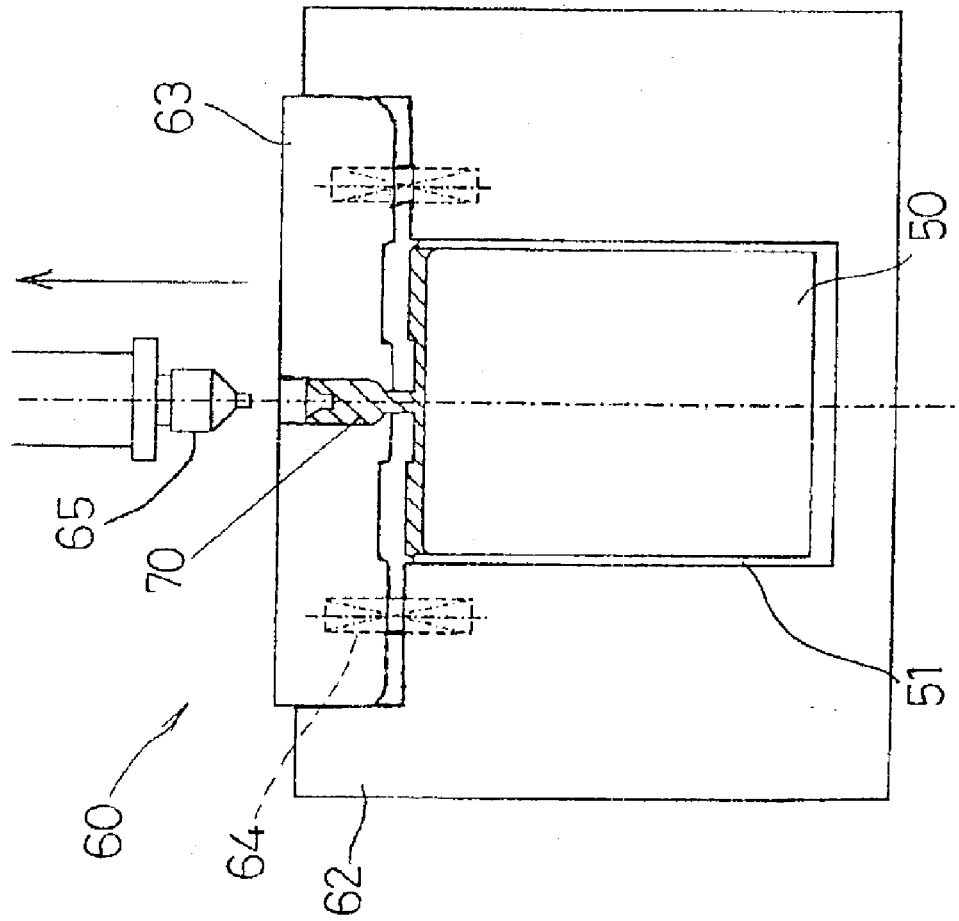

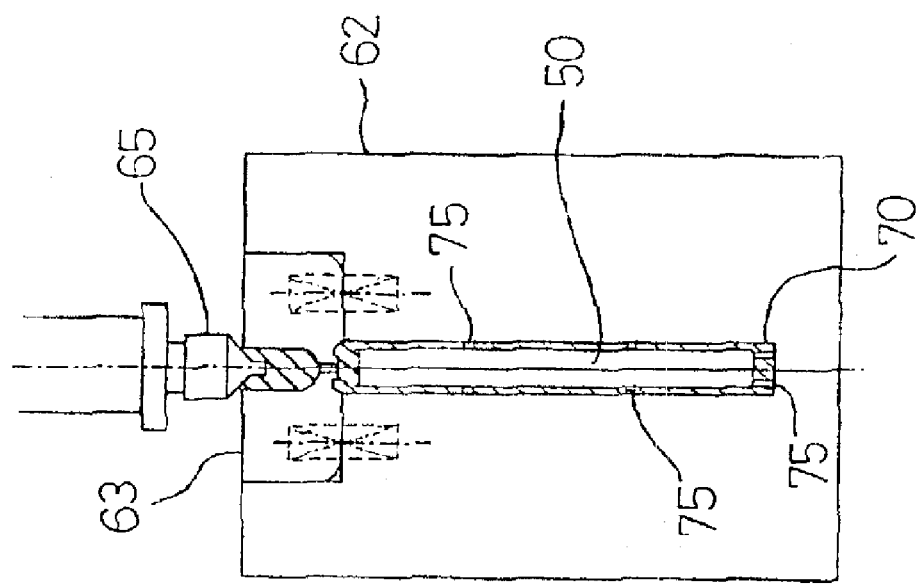
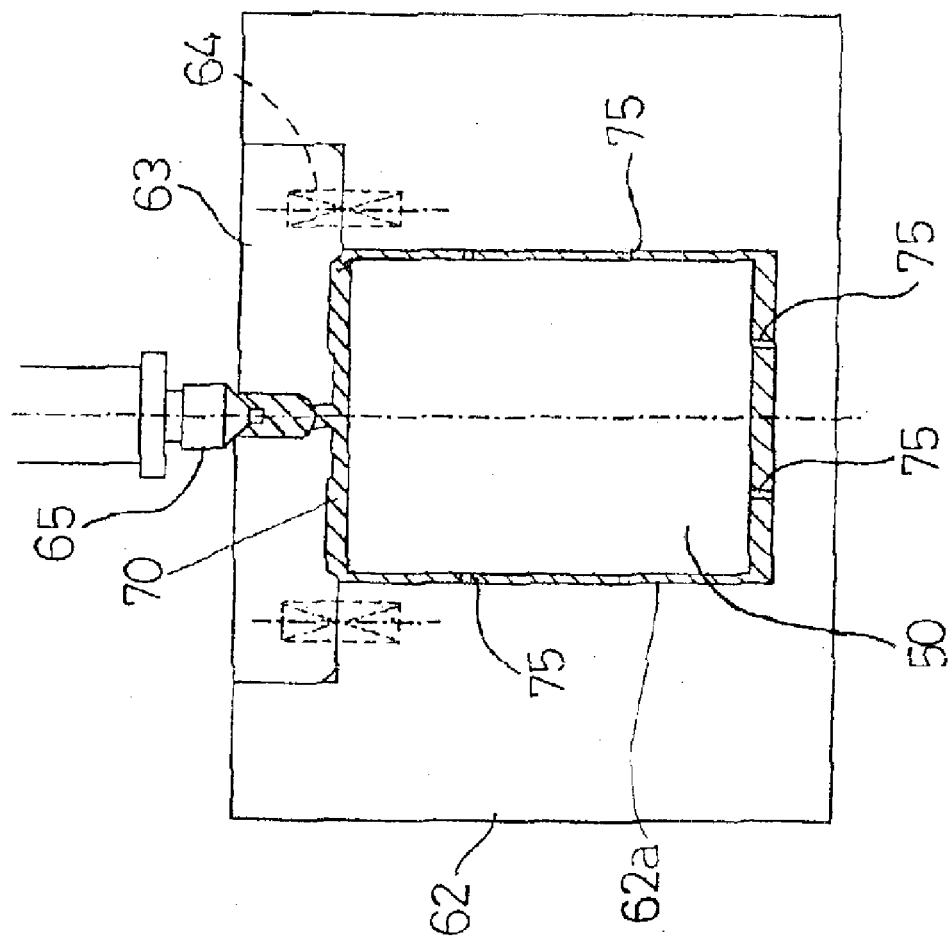
Fig. 15A
Fig. 15B

Prior Art
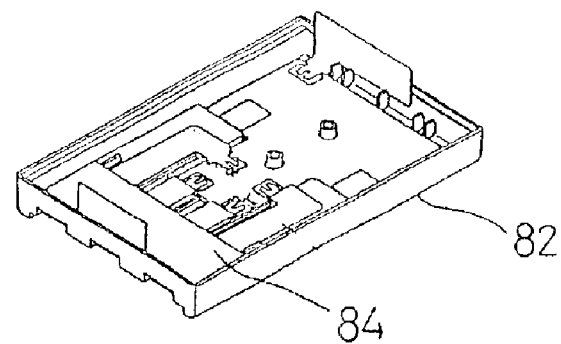
Fig. 16A
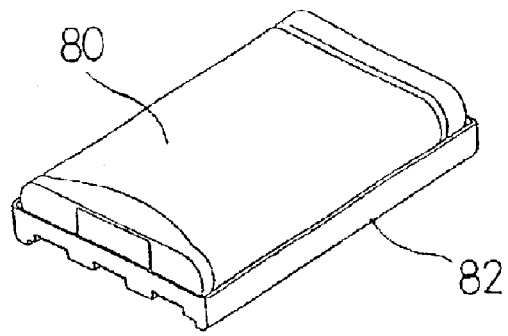
Fig. 16B
Fig. 16C
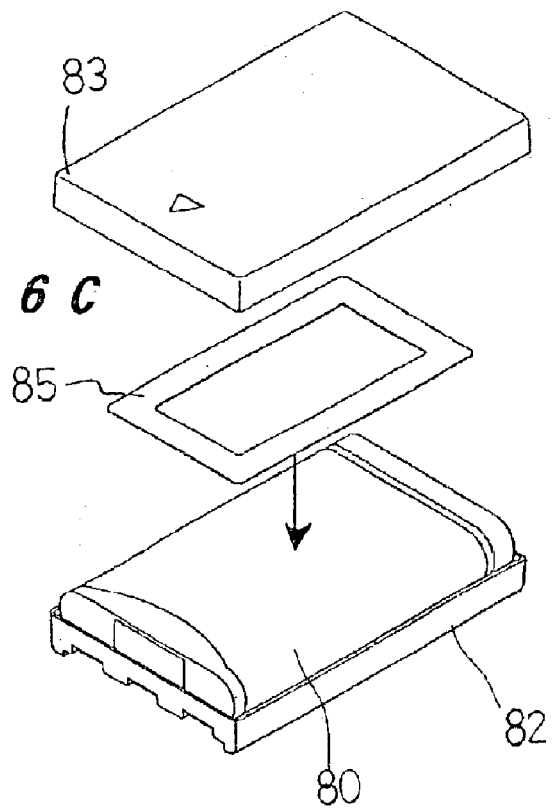

METHOD FOR FORMING OUTER PACKAGING BODY OF PRODUCT

TECHNICAL FIELD

The present invention relates to a method and an apparatus for forming a product's outer packaging body by covering constituent elements of a product with molten resin, followed by curing the resin.

BACKGROUND ART

Not only compactness, slimness, and weight reduction, but also a dust-proof, drip-proof structure or resistance to dropping and impact, have been sought after in such products as portable electronic appliances, due to their necessarily transportable nature and the changing environment in which they may be used. The outer packaging body structure for a product is of particular importance to satisfy these requirements. FIGS. 16A through 16C show an example of such a product. This is a battery pack for use as a power source in a portable electronic appliance. The battery pack is constructed by housing a rechargeable battery 80 and a circuit board 84, which constitutes a battery protective circuit and the like, in an outer packaging body.

The outer packaging body of the battery pack is a pack case composed of a lower case 82 and an upper case 83. As shown in FIG. 16A, inside the lower case 82 are arranged the circuit board 84 for constituting a battery protective circuit, an input/output terminal, and a connection plate, etc. Arranged thereon is the rechargeable battery 80, built as a lithium ion rechargeable battery, as shown in FIG. 16B. Then, the rechargeable battery 80 is joined to the connection plate. Next, as shown in FIG. 16C, double-faced tape 85 is applied to the rechargeable battery 80 to bond the upper case 83 to the lower case 82, thereby completing a battery pack.

The lower case 82 and the upper case 83 are bonded together at their peripheral edges by ultrasonic welding. As shown in FIG. 17, a projection 82a formed at the peripheral edge of the lower case 82 is fitted into a concavity 83a formed at the peripheral edge of the upper case 83. The front end of the projection 82a and the bottom of the concavity 83a are then bonded together by ultrasonic welding.

However, a conventional outer packaging body cannot be constructed without performing bonding of separate cases. In the conventional example described above, both the lower case 82 and the upper case 83 need to have a side peripheral surface of certain thickness for proper bonding. This leads to an undesirable increase in the volume and weight of the pack case, namely, the entire battery pack.

Furthermore, the pack case is constructed as a rigid case, and there must be provision for the input/output terminals to be exposed externally while the lower case 82 and the upper case 83 are bonded together. As a consequence, minute gaps are inevitably created at various places in the pack case, which makes it difficult to secure satisfactory dust-proof and drip-proof performance. What is worse, the pack case is prone to breakage from falling.

An object of the present invention is to provide a method and an apparatus for forming a product's outer packaging body covering the product's constituent elements completely, the packaging body that allows not only miniaturization and weight reduction, but also offers an enclosure which is dust-proof, drip-proof, and resistant to impact.

DISCLOSURE OF THE INVENTION

To achieve the above object, according to a first aspect of the present invention, there is provided a method for forming an outer packaging body of a product, the method including: forming an intermediate product by combining together a plurality of constituent elements, followed by providing an external connection terminal on an outer surface of the combined elements; arranging the intermediate product in a main mold; charging molten resin in the main mold so that an entire surface of the intermediate product is covered with the resin while an opening which corresponds to the external connection terminal is formed; and curing the charged resin to form the outer packaging body in a predetermined dimensional configuration. With this method, the intermediate product, which is an internal constituent component of the product, can be covered with resin without providing a joint portion. Thus, the volume of the outer packaging body is made at a minimum, thereby achieving miniaturization of the product.

According to a second aspect of the invention, there is provided a method for forming an outer packaging body of a product, the method including: forming an intermediate product by combining together a plurality of constituent elements, followed by providing an external connection terminal on an outer surface of the combined elements; inserting the intermediate product in an outer packaging case having an opened portion in such a way that the external connection terminal is located on the opened-portion side; charging molten resin in the opened portion so that the opened portion is sealed with the resin while an opening which corresponds to the external connection terminal is formed; and curing the charged resin to seal up the opened portion of the outer packaging case. With this method, the intermediate product is covered with the outer packaging case except for a surface on which the external connection terminal is formed. After an opening is formed at the location of the external connection terminal, the opened portion of the outer packaging case is sealed with resin, thereby realizing an enclosed outer packaging body. Consequently, not only miniaturization but also a dust-proof, drip-proof structure is achieved.

According to a third aspect of the invention, there is provided a method for forming an outer packaging body of a product, the method including: forming an intermediate product by combining together a plurality of constituent elements, followed by providing an external connection terminal on an outer surface of the combined elements; inserting the intermediate product in an outer packaging case having an opening formed thereon at a position corresponding to the external connection terminal and having an opened portion pointing to a given direction, from the opened portion; charging molten resin in the opened portion; and curing the charged resin to seal up the opened portion of the outer packaging case. With this method, the intermediate product is covered with the outer packaging case except for the opened portion, and the external connection terminal is exposed externally from the opening of the outer packaging case. By sealing the opened portion with resin, an enclosed outer packaging body is realized. As a consequence, not only miniaturization but also a dust-proof, drip-proof structure is achieved.

According to a fourth aspect of the invention, there is provided an apparatus for forming an outer packaging body by charging resin with respect to a predetermined surface of an object to be resin-sealed, so as to resin-seal the object, the apparatus including: a main mold having a housing space for housing the object to be resin-sealed; a core with a gate formed therein; an elastic member for energizing the core to move it in a direction away from the main mold; and a resin injection nozzle, which allows the core to be pressed on the main mold housing the object against an energizing force exerted by the elastic member, for charging the resin in a space between the object and the core through the gate.

According to the above-described apparatus, by driving the resin injection nozzle to move toward the main mold housing the object to be resin-sealed, the core is pressed on the main mold against an energizing force exerted by the elastic member, thereby closing the main mold. Thus, resin poured through the resin injection nozzle is charged in the charging space. The product to be resin-sealed is housed in the main mold in such a way that its predetermined surface subjected to resin sealing faces the charging space, so that the product is sealed with resin. Moreover, since the main mold and the core are brought into intimate contact with each other by the advancing action of the resin injection nozzle, the product is inserted and extracted readily.

BRIEF DESCRIPTION OF THE DRAWINGS

FIG. 4A is a plan view of the top surface of a circuit board, and FIG. 4B is a plan view of the back surface of the circuit board;

FIGS. 10A and 10B are sectional views each showing a first process step performed in an outer packaging body forming apparatus;

FIGS. 11A and 11B are sectional views each showing a second process step;

FIGS. 12A and 12B are sectional views each showing a third process step;

FIGS. 13A and 13B are sectional views each showing a fourth process step;

FIGS. 15A and 15B are sectional views each showing the battery pack, the entire surface of which being resin-sealed by the outer packaging body forming apparatus;

FIGS. 16A through 16C are perspective views showing an assembly operation for a conventional battery pack step by step.

BEST MODE FOR CARRYING OUT THE INVENTION

Figure 1:
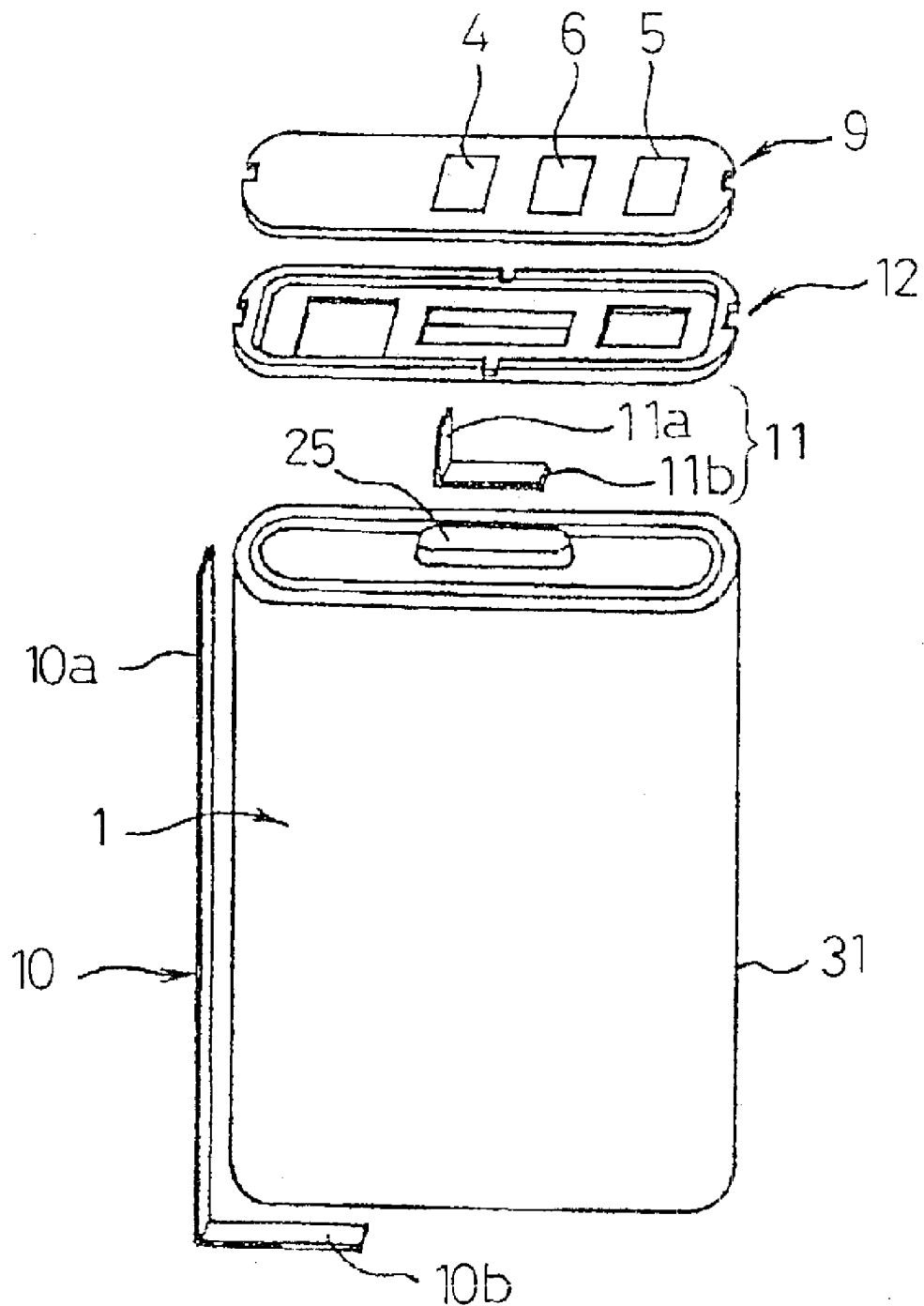
FIG. 1 is an exploded perspective view showing the configuration of an intermediate product in accordance with one embodiment of the present invention.
Figure 2A:
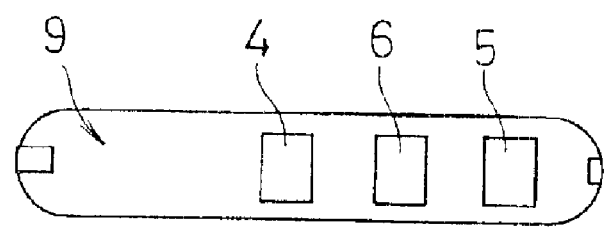
FIGS. 2A and 2B are a plan view and a side view, respectively, of the intermediate product.
Figure 2B:
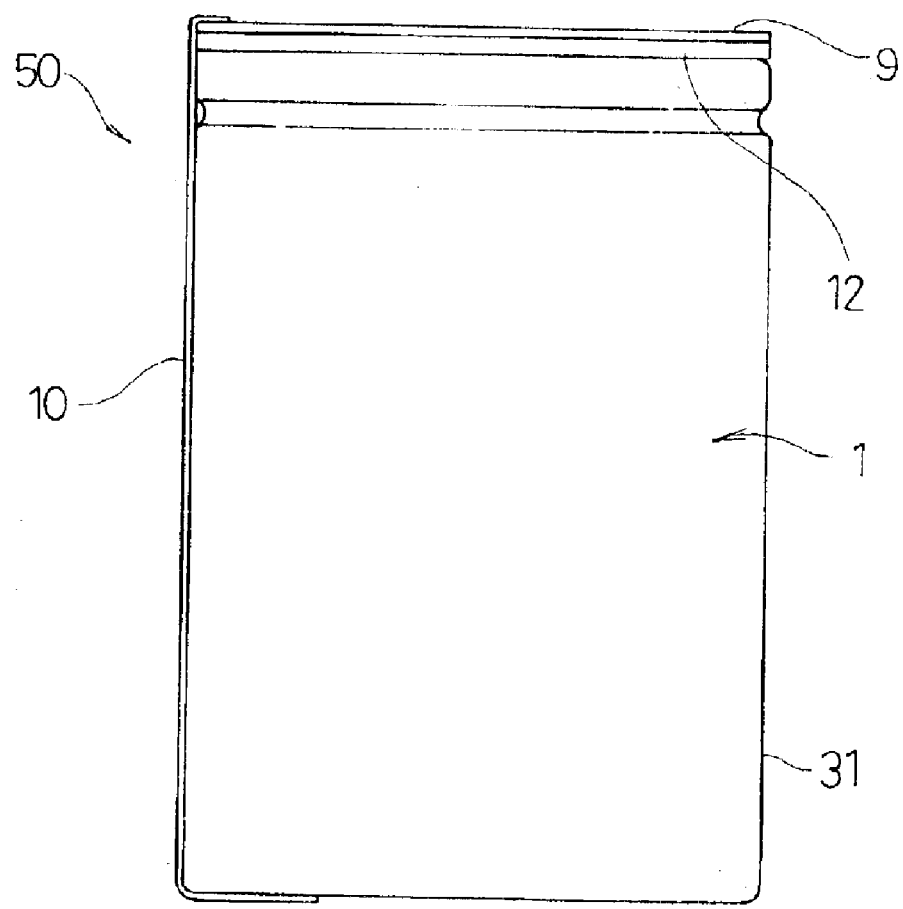
Figure 3:
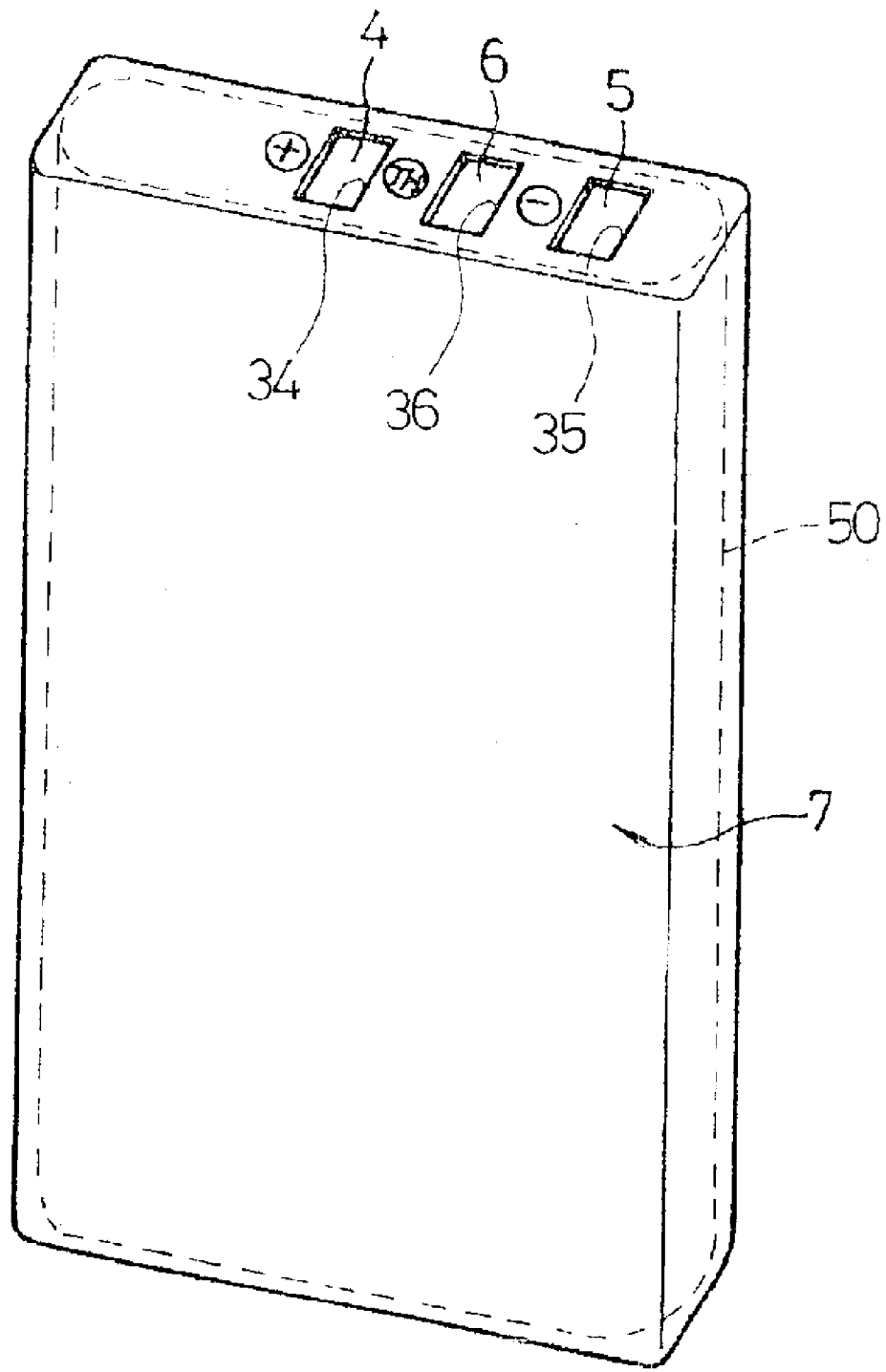
FIG. 3 is a perspective view of a battery pack in a completed form.

Embodiment described hereinbelow is an example practiced by applying an outer packaging body forming method embodying the present invention to a pack case (outer packaging body) of a battery pack (product). As shown in FIG. 1, a rechargeable battery 1 and a circuit board 9 are combined together to form an intermediate product 50 as shown in FIGS. 2A and 2B. The rechargeable battery 1 is built as a flat-shaped lithium ion rechargeable battery. The circuit board 9 constitutes a battery protective circuit for protecting the rechargeable battery 1 from overcharging, overdischarging, or other problems, and in which a plurality of input-output terminals are formed. As shown in FIG. 3, the intermediate product 50 is housed in a pack case 7, thereby constituting a battery pack.

FIG. 1 is an exploded view showing the intermediate product 50. On a seal portion side of the rechargeable battery 1 are arranged a connection plate 11 which is bonded to a positive electrode terminal 25 of the rechargeable battery 1; a spacer 12 disposed on the rechargeable battery 1, for providing a bearing surface for the circuit board 9; and the circuit board 9 for constituting a battery protective circuit, which incorporates a plus terminal 4, a minus terminal 5, and a temperature detecting terminal 6. Also disposed thereon is a lead plate 10 that extends from a bottom surface to a side surface of a battery case 31 for constituting a negative electrode of the rechargeable battery 1.

A base portion 11b of the L-shaped connection plate 11 is bonded to the positive electrode terminal 25 of the rechargeable battery 1. A base portion 10b of the lead plate 10 is bonded to the bottom surface of the battery case 31. A lead portion 10a is extended, along the side surface of the battery case 31, to the seal portion.

Moreover, as shown in FIGS. 2A and 2B, attached on the seal portion side of the rechargeable battery 1 is the spacer 12. The spacer 12 is positioned and fitted onto the rechargeable battery 1, so that the insulation property with respect to the battery case 31 acting as a negative electrode is enhanced. Moreover, a lead portion 11a of the connection plate 11 and the lead portion 10a of the lead plate 10 are bonded, via the spacer 12 and the circuit board 9, to a soldering land placed on the top surface of the circuit board 9. Since the electronic component, mounted on the seal portion side of the circuit board 9, is housed in an opening of the spacer 12, the circuit board 9 is stacked on the rechargeable battery 1, with a height which is as small as the sum of the thickness of its substrate and the thickness of the spacer 12. This makes it possible to suppress an undesirable increase in height due to placement of the battery protective circuit.

FIGS. 4A and 4B illustrate, in perspective, circuit patterns formed on the top and back surfaces of the circuit board 9, and electronic components mounted thereon. On the substrate is formed a battery protective circuit and an input/output terminal. As shown in FIG. 4B, on the back side (spacer 12 side) of the circuit board 9 is formed the battery protective circuit incorporating IC components 21 and 22, and a chip component 26. On the other hand, as shown in FIG. 4A, on the top side thereof are formed the plus terminal 4; the minus terminal 5; the temperature detecting terminal 6; a connection plate conductor pattern 15 for connecting the connection plate 11; and a lead plate conductor pattern 16a for connecting the lead plate 10. The circuit patterns formed on both sides of the circuit board 9 are connected to each other at appropriate positions by through holes 30.

In the circuit board 9 is formed a lead through hole 20, through which the lead portion 11a of the connection plate 11 is inserted. The lead portion 11a inserted is bent above the connection plate conductor pattern 15, and is then subjected to soldering. Moreover, lead plate through concavities 29 and 29 are formed at opposite ends of the circuit board 9. The lead portion 10a of the lead plate 10 is passed through one of the lead plate through concavities 29, is bent above the lead plate conductor pattern 16a, and is then subjected to soldering. By subjecting the connection plate 11 and the lead plate 10 to soldering, the circuit board 9 is fixed onto the spacer 12. Note that, although the lead plate 10 is disposed only on one side of the construction, it is also possible to dispose the lead plate 10 on both sides and bond them to the circuit board 9. In this case, the circuit board 9 is fastened more securely.

As shown in FIG. 4A, on the top side of the circuit board 9 are formed a plus terminal conductor pattern 4a to which the plus terminal 4 is bonded; a minus terminal conductor pattern 5a to which the minus terminal 5 is bonded; a temperature detecting terminal conductor pattern 6a to which the temperature detecting terminal 6 is bonded. These terminals are each formed of a plate made of an alloy of copper and nickel, a clad material composed of the copper-nickel alloy plate and a stainless steel, or the like, so as to achieve excellent conductivity, bondability, and corrosion resistance. Alternatively, the terminal can be realized simply by applying a gold plating to the conductor pattern, without performing bonding of a plate.

As described above, by attaching the circuit board 9 to the rechargeable battery 1, the intermediate product 50 is constructed as shown in FIGS. 2A and 2B. As shown in FIG. 3, the intermediate product 50 is housed in the pack case 7. Hereafter, how the pack case 7 is constructed will be described according to first through fifth practical examples.

FIRST EXAMPLE

There is prepared a mold whose content volume is set in conformity with the outer dimensional configuration of the pack case 7. The mold is provided with a protrusion necessary for forming three openings: a plus terminal window 34 at a position corresponding to the plus terminal 4; a minus terminal window 35 at a position corresponding to the minus terminal 5; and a temperature detecting terminal window 36 at a position corresponding to the temperature detecting terminal 6. The intermediate product 50 is arranged, in a suspended state, within the mold with use of a slender supporting member. Subsequently, molten resin is poured into the mold.

Since the intermediate product 50 has a single-piece structure with a slight gap left, the injected resin is filled in a gap between the mold and the intermediate product 50. After performing curing, the resin is taken out of the mold, whereupon the pack case 7 is constructed that encloses the intermediate product 50. As shown in FIG. 3, the pack case 7 has three openings: the plus terminal window 34; the minus terminal window 35; and the temperature detecting terminal window 36 formed at the positions corresponding to the plus terminal 4, the minus terminal 5, and the temperature detecting terminal 6, respectively.

In the configuration of this example, the pack case 7, having a single-piece structure, is formed as a thin outer packaging body. This makes it possible to realize a compact, lightweight battery pack. Moreover, since the charged resin adheres to the peripheries of the plus terminal 4, the minus terminal 5, and the temperature detecting terminal 6, the pack case 7 is hermetically sealed perfectly. Thus, the dust-proof and drip-proof properties are enhanced.

A method for molding the pack case 7 by the resin filling will be described in detail later.

SECOND EXAMPLE

Figure 5A:
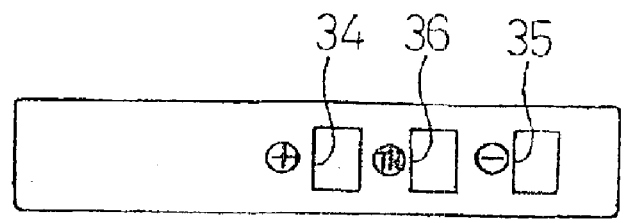
FIGS. 5A, 5B, and 5C are a top view, a side view, and a bottom view, respectively, of an outer packaging case constituting the pack case in accordance with a second example of the embodiment.
Figure 5B:
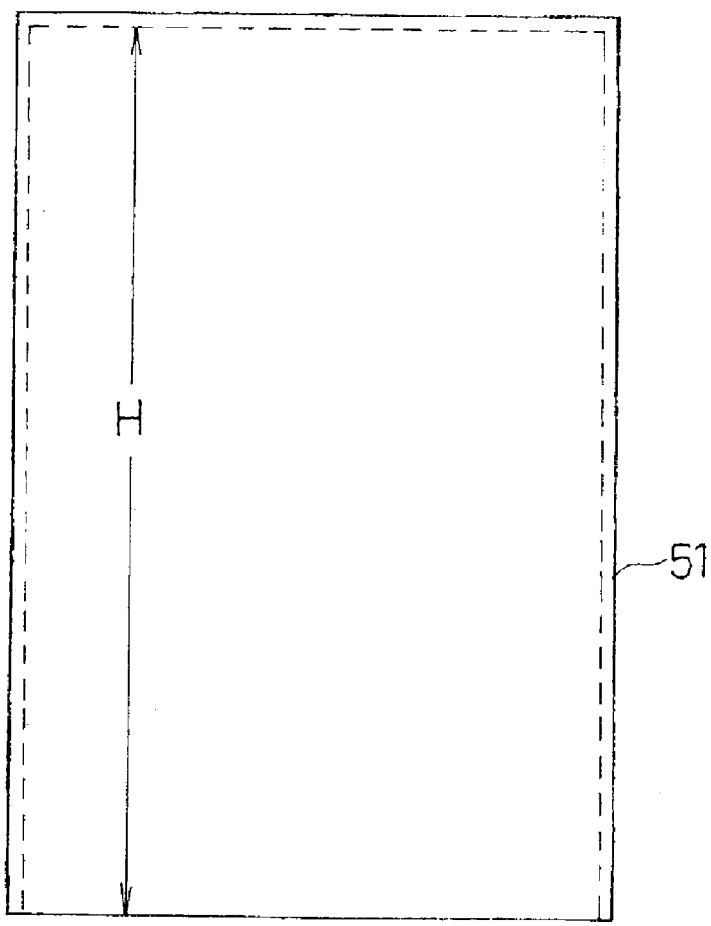
Figure 5C:
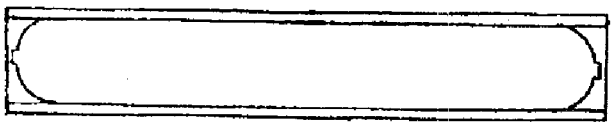

As shown in FIGS. 5A to 5C, an outer packaging case 51 is formed by resin molding. The outer packaging case 51 has the shape of a bottomed prismatic sleeve, and its depth H is made slightly longer than the entire length of the intermediate product 50. As shown in FIG. 5A, on the bottom surface of the outer packaging case 51 are formed a plus terminal window 34; a minus terminal window 35; and a temperature detecting terminal window 36 so as to correspond to the plus terminal 4, the minus terminal 5, and the temperature detecting terminal 6, respectively, of the intermediate product 50.

Figure 6A:
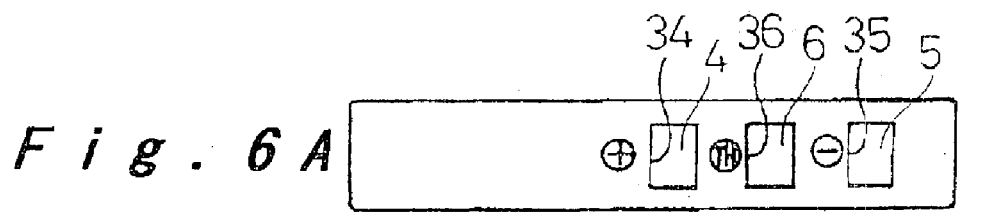
FIGS. 6A, 6B, and 6C are a plan view, a sectional view, and a bottom view, respectively, showing a state in which the intermediate product is housed in the outer packaging case.
Figure 6B:
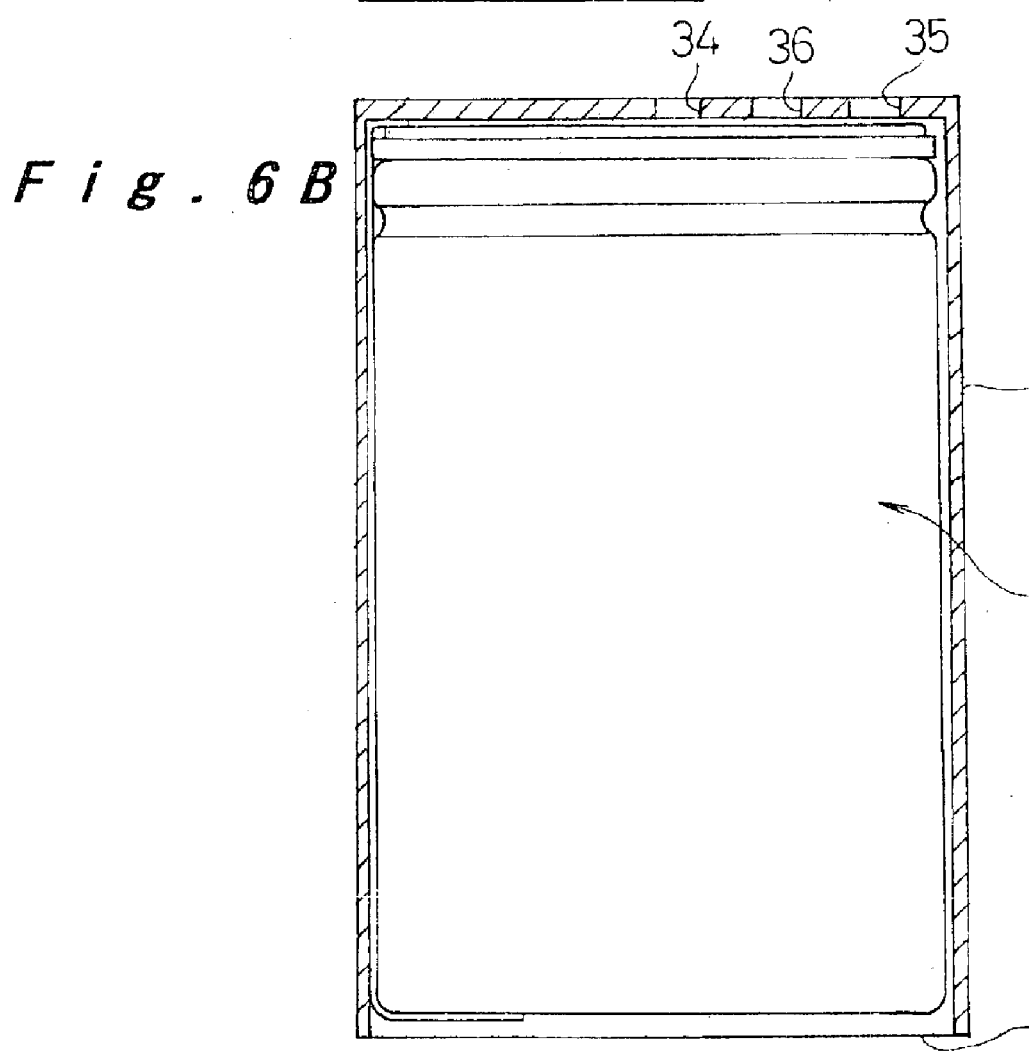
Figure 6C:
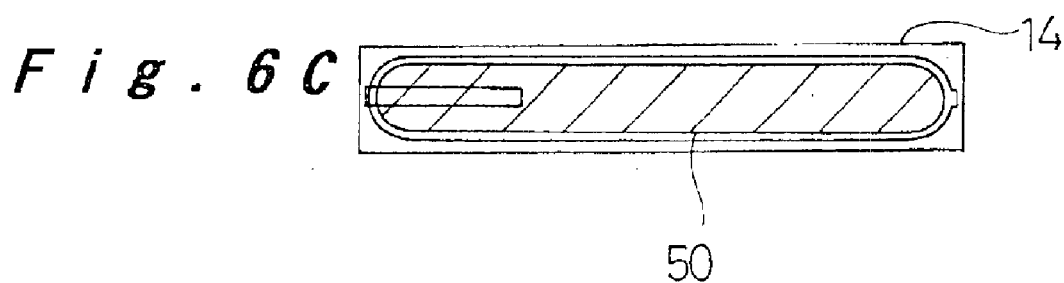

As shown in FIGS. 6A to 6C, the intermediate product 50 is inserted into the outer packaging case 51. The plus terminal 4, the minus terminal 5, and the temperature detecting terminal 6 are exposed from their corresponding openings: the plus terminal window 34; the minus terminal window 35; and the temperature detecting terminal window 36, respectively. Subsequently, molten resin is filled in an open end 14 of the outer packaging case 51, followed by curing. Thereby, the outer packaging case 51 and the resin charged in the opening are formed into a pack case 7 as shown in FIG. 3.

As shown in FIG. 3, the pack case 7 thus constructed has three openings: the plus terminal window 34; the minus terminal window 35; and the temperature detecting terminal window 36 formed so as to correspond to the plus terminal 4, the minus terminal 5, and the temperature detecting terminal 6, respectively. The intermediate product 50 is enclosed with the pack case 7.

THIRD EXAMPLE

Figure 7D:
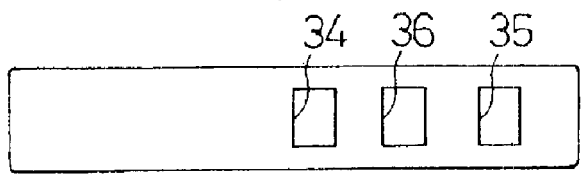
FIG. 7D is a top view showing the pack case with its top surface sealed up.
Figure 7A:
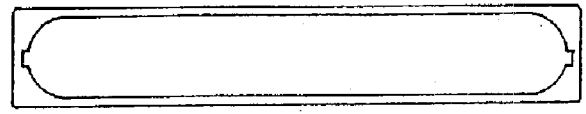
FIGS. 7A, 7B, and 7C are a top view, a side view, and a bottom view, respectively, of an outer packaging case constituting the pack case in accordance with a third example of the embodiment.
Figure 7B:
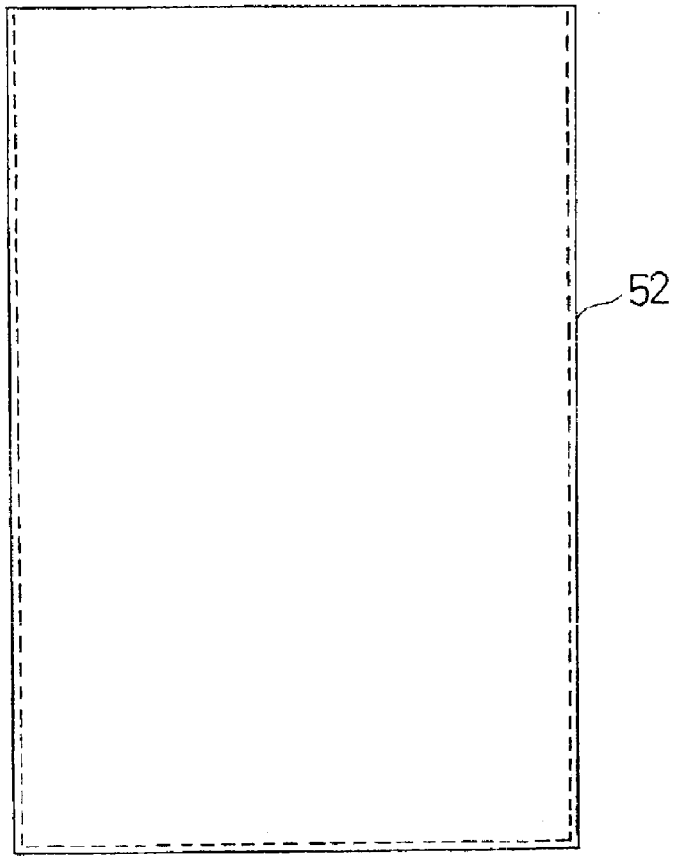
Figure 7C:

As shown in FIGS. 7A to 7D, an outer packaging case 52 is formed, in the shape of a bottomed prismatic sleeve, by resin molding. The intermediate product 50 is inserted into the outer packaging case 52, with its circuit board 9 facing the open end. Thereafter, a mold is arranged for forming a plus terminal window 34; a minus terminal window 35; and a temperature detecting terminal window 36 at the open end of the outer packaging case 52, and for sealing up the open end. Subsequently, molten resin is filled in a space around the open end, followed by curing. Whereupon, as shown in FIG. 7D, the plus terminal window 34; the minus terminal window 35; and the temperature detecting terminal window 36 are formed.

The open end of the outer packaging case 52 is sealed up, so that, as shown in FIG. 3, the plus terminal 4, the minus terminal 5, and the temperature detecting terminal 6 are exposed externally from the plus terminal window 34, the minus terminal window 35, and the temperature detecting terminal window 36, respectively. Eventually, a pack case 7 is realized that encloses the intermediate product 50.

In this example, since the charged resin adheres to the peripheries of the plus terminal 4, the minus terminal 5, and the temperature detecting terminal 6, the pack case 7 is hermetically sealed perfectly. Thus, the dust-proof and dripproof properties are enhanced.

FOURTH EXAMPLE

Figure 8A:
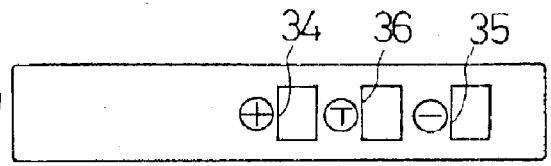
FIGS. 8A and 8B are a top view and a side view, respectively, of an outer packaging case constituting the pack case in accordance with a fourth example of the embodiment.
Figure 8B:
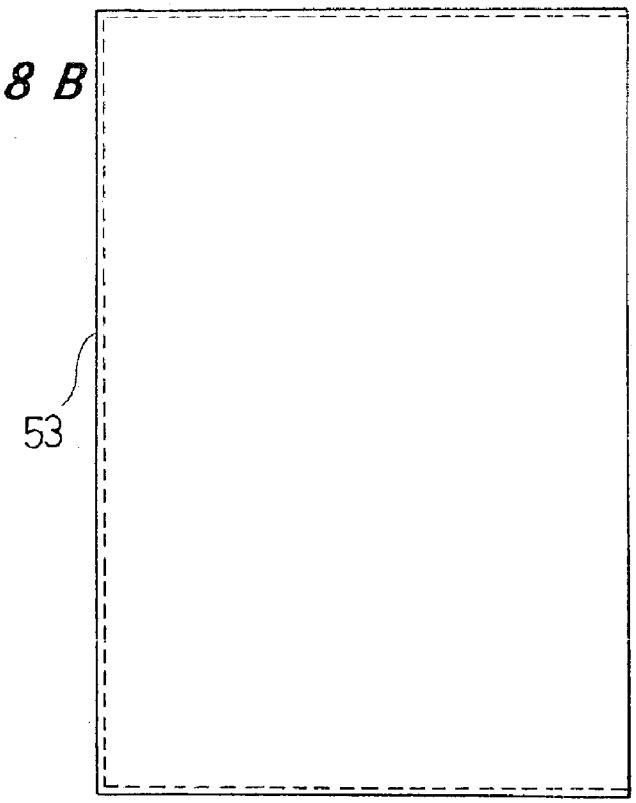
Figure 8C:
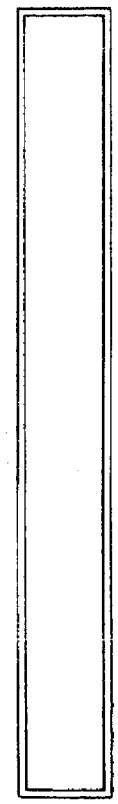
FIG. 8C is a plan view of the opened portion of the pack case.

As shown in FIGS. 8A to 8C, an outer packaging case 53 is formed by resin molding. The outer packaging case 53 has the shape of a bottomed prismatic sleeve, and its one longer-side surface is opened. On one shorter-side surface are formed a plus terminal window 34; a minus terminal window 35; and a temperature detecting terminal window 36. The intermediate product 50 is inserted into the outer packaging case 53 from the side surface. The plus terminal 4, the minus terminal 5, and the temperature detecting terminal 6 are exposed externally from the plus terminal window 34, the minus terminal window 35, and the temperature detecting terminal window 36, respectively. Subsequently, to seal up the open end of the outer packaging case 53, molten resin is filled in a space around the open end, followed by curing.

The open end of the outer packaging case 53 is sealed up, so that, as shown in FIG. 3, the plus terminal 4, the minus terminal 5, and the temperature detecting terminal 6 are exposed externally from the plus terminal window 34, the minus terminal window 35, and the temperature detecting terminal window 36, respectively. Eventually, a pack case 7 is realized that encloses the intermediate product 50.

FIFTH EXAMPLE

Figure 9B:
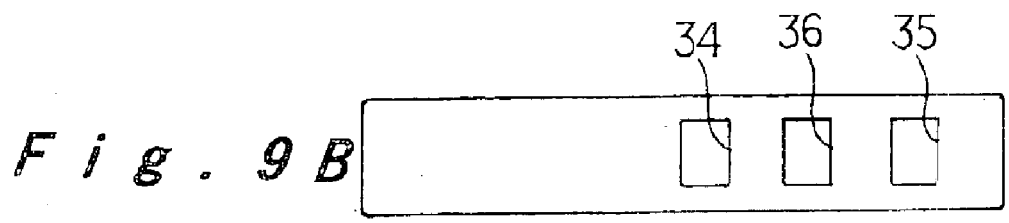
FIG. 9B is a top view showing the pack case with its top surface sealed up.
Figure 9A:
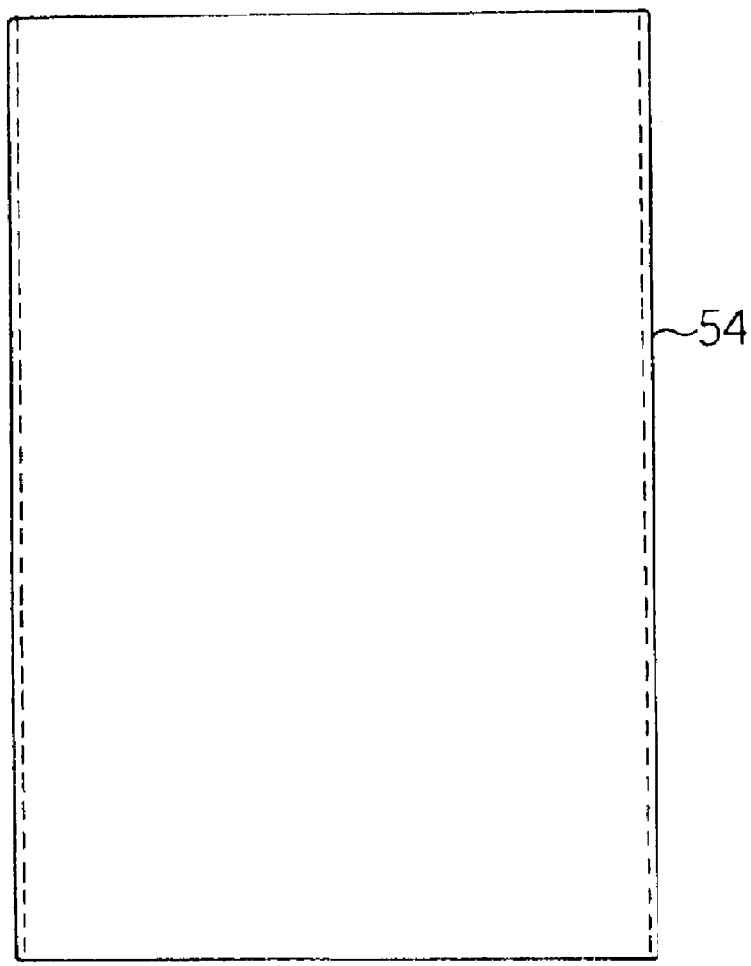
FIG. 9A is a side view of an outer packaging case constituting the pack case in accordance with a fifth example of the embodiment.
Figure 9C:
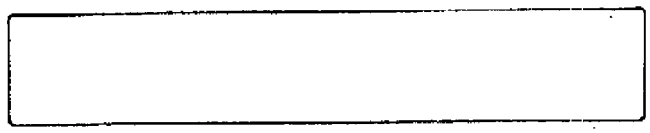
FIG. 9C is a bottom view showing the pack case with its bottom surface sealed up.

As shown in FIG. 9A, a prismatic sleeve-shaped outer packaging case 54 is formed by resin molding. The intermediate product 50 is inserted into the outer packaging case 54, and then the opposite open ends of the outer packaging case 54 are sealed up. Alike to the third example, its one side facing the terminal surface of the intermediate product 50 is subjected to resin sealing with molten resin, so that the outer packaging case 54 has, on the one side, a plus terminal window 34, a minus terminal window 35, and a temperature detecting terminal window 36 from which the plus terminal 4, the minus terminal 5, and the temperature detecting terminal 6 are exposed, respectively. The other side of the outer packaging case 54 is, alike to the second example, subjected to resin sealing with molten resin.

The opposite ends of the outer packaging case 54 are sealed up, so that, as shown in FIG. 3, the plus terminal 4, the minus terminal 5, and the temperature detecting terminal 6 are exposed externally from the plus terminal window 34, the minus terminal window 35, and the temperature detecting terminal window 36, respectively. Eventually, a pack case 7 is realized that encloses the intermediate product 50.

In any of the first to fifth examples, preferred examples of the resin to be charged include: thermoplastic resin such as polyamide- or polyurethane-base resin; thermosetting resin; and hot melt resin. Thermoplastic resin that melts at a low temperature, and thermosetting resin that cures at a low temperature or room temperature are particularly desirable to reduce thermal effects on the intermediate product 50. Besides, by using resin that lends itself to low pressure molding, the effects of pressure on the intermediate product 50 are reduced, and thus the mold is produced at lower cost.

Moreover, in each of the configurations according to the second to fifth examples, charged resin enters between the outer packaging case 51 to 54 and the intermediate product 50. Consequently, even if the packaging case 51 to 54 is made smaller in thickness, adequate strength is secured, resulting in an advantage in enhancing the strength of the battery pack.

Further, by controlling the property of resin in such a way that its hardness is kept low after curing, an impact absorption effect is achieved. Hence, in a battery pack employing the outer packaging body, the resistance to shock resulting from dropping or other accidents is improved. The battery pack is thus suitably used as a power source in a portable electronic appliance.

Next, an apparatus for forming an outer packaging body will be described. The outer packaging body forming apparatus according to the embodiment is intended for the following purpose for example. As described earlier, an intermediate product (object to be resin-sealed) 50 as shown in FIGS. 2A and 2B is formed by combining a rechargeable battery 1 and a circuit board 9 which constitutes a battery protective circuit for protecting the rechargeable battery 1 from overcharging, overdischarging, and the like troubles. The intermediate product 50 is then subjected to resin sealing, so that a battery pack is constructed.

The intermediate product 50 is housed in an outer packaging case 51 having an opened bottom. Then, the open end of the outer packaging case 51 is sealed with resin by an outer packaging body forming apparatus 60, which will be described later. In this way, the intermediate product 50 is hermetically sealed in a pack case 7.

FIGS. 10A to 13B are sectional views showing a resin sealing process performed by the outer packaging body forming apparatus 60 step by step. In these figures, the outer packaging body forming apparatus 60 is illustrated, on a process-step basis, as being viewed in two orthogonal directions with respect to a main mold portion.

In FIGS. 10A and 10B, a main mold 62 and a core 63 are formed in a split-cavity mold structure, with its butt face composed of a gate position. Therewith, the intermediate product 50 can be inserted and extracted freely. Moreover, this structure is adaptable to an undercut resulting from formation of a sprue 67 in the gate portion. In the main mold 62 is formed a cavity 62a. In the core 63 are formed a surface 63a for creating a space necessary for resin charging; a gate 66 communicating with the 63a; and the sprue 67 communicating with the gate 66. Moreover, the core 63 is energized by a spring (elastic member) 64 so as to move it in a direction away from the main mold 62. As shown in the figures, the main mold 62 is opened, and the intermediate product 50 covered with the outer packaging case 51 is inserted into the cavity 62a, with its open end facing the core 63.

Next, as shown in FIGS. 11A and 11B, the main mold 62 and the core 63 are closed, and a resin injection nozzle 65 is driven to move toward the main mold 62, so that the core 63 is pressed on the main mold 62 against an energizing force exerted by the spring 64. Consequently, as shown in FIGS. 12A and 12B, the core 63 is brought into intimate contact with the main mold 62. At this time, a charging space is secured in between the upper open end of the outer packaging case 51 and the core 63. Resin 70 is discharged from the resin injection nozzle 65 into the sprue 67, and is then charged in the charging space through the gate 66. By charging the resin 70, the open end of the outer packaging case 51 is resin-sealed. Moreover, since the charged resin 70 also finds its way into the gap between the outer packaging case 51 and the intermediate product 50, the packaging case 51 and the product 50 are formed integrally with each other. This makes it possible to ensure adequate strength even if the outer packaging case 51 is formed of a thin resin-molded article. Thus, the resulting battery pack is made compact.

Figure 14A:
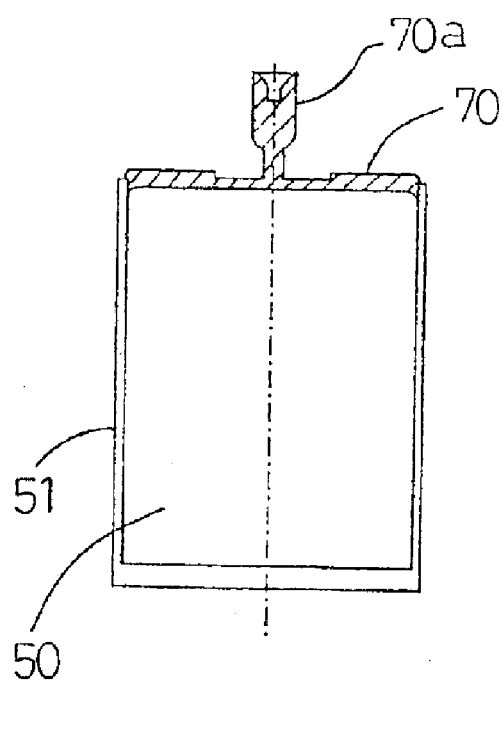
FIG. 14A is a sectional view showing that a resin sealing molding operation has been completed.
Figure 14B:
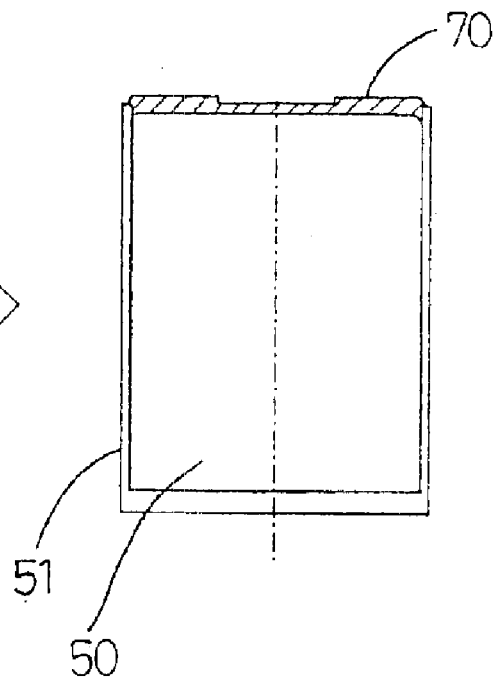
FIG. 14B is a sectional view showing the battery pack in a completed form.
Figure 17:
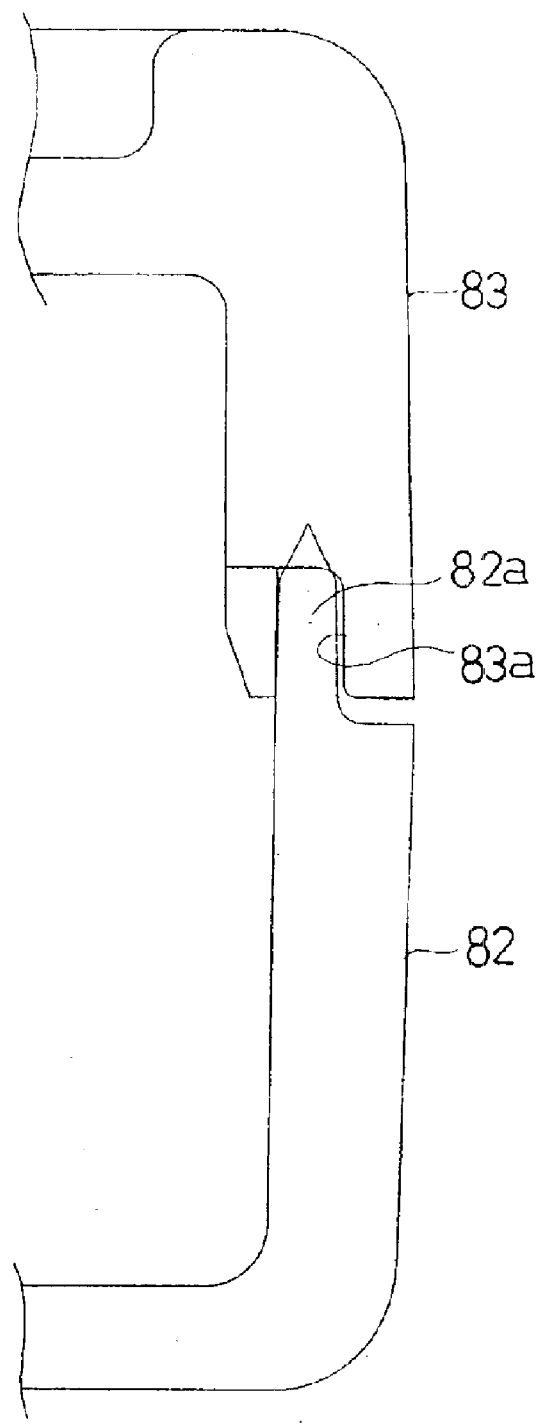
FIG. 17 is a partial sectional view showing a bonding status of a conventional pack case.

After curing the charged resin 70, as shown in FIGS. 13A and 13B, the main mold 62 and the core 63 are opened, and the resin injection nozzle 65 is driven to retract. Thereupon, a battery pack molded by resin sealing is taken out. As shown in FIG. 14A, as a result of molding the resin 70, there is an unnecessary portion 70a left that has been created by the gate 66 and the sprue 67. This portion 70a is cut away, and eventually, as shown in FIG. 14B, there is provided a battery pack obtained by covering the intermediate product 50 with the outer packaging case 51 and the resin 70.

Although the above-described outer packaging body forming apparatus 60 is designed to resin-seal the open end of the outer packaging case 51 having an opened bottom, it can also be designed to resin-seal the outer packaging case 52 having its top surface formed as an open end. In this case, the intermediate product 50 is inserted into the outer packaging case 52, and an opening is formed in the terminal portion. Lastly, the top surface is resin-sealed. This is achieved by forming, on the charging space creating surface 63a of the core 63, a projection which abuts against the terminal portion.

Alternatively, as shown in FIGS. 15A and 15B, the cavity 62a, which is formed in the main mold 62, is so formed that its volumetric capacity is preferably such as to create a space around the intermediate product 50. Besides, the cavity 62a is so formed as to have, in several positions around its inner wall, pins 75 for supporting the intermediate product 50 in a suspended state. With this structure, as shown in the figures, the resin 70 injected from the resin injection nozzle 65 is filled around the intermediate product 50, thereby resin-sealing the entire surface of the intermediate product 50. Also in this case, an opening is formed in the terminal portion, as described above.

Polyamide- or polyurethane-base hot melt resin is preferably used for the resin-sealing molding described above. Further, by controlling the property of resin in such a way that its hardness is kept low after curing, an impact absorption effect is achieved. This makes it possible to impart improved resistance to shock caused by dropping or other accidents to the battery pack. Hence, the battery pack is suitably used as a power source in a portable electronic appliance.

Industrial Applicability

According to the present invention, an outer packaging body of a product is made thin by resin-sealing a given surface of the product. Thus, not only it is possible to downsize the outer packaging body and enhance the strength, but it is also possible to achieve dust-proof, drip-proof structure by adopting an enclosed structure. The construction thus obtained is suitably applicable to a portable electronic appliance and the like.

What is claimed is:

1. A method for forming an outer packaging body of a product including a rechargeable battery and a battery protective circuit for protecting the rechargeable battery from overcharging and overdischarging, the method comprising:

forming an intermediate product by combining together a plurality of constituent elements, followed by providing an external connection terminal and the battery protective circuit on an outer surface of the combined elements;

arranging the intermediate product in a mold;

charging molten resin in the mold so that at least the battery protective circuit of the intermediate product is covered with the resin while an opening which corresponds to the external connection terminal is formed; and curing the charged resin to form the outer packaging body in a predetermined dimensional configuration.

2. A method for forming an outer packaging body of a product, the method comprising:

forming an intermediate product by combining together a plurality of constituent elements, followed by providing an external connection terminal on an outer surface of the combined elements;

inserting the intermediate product in an outer packaging case having an opened portion in such a way that the external connection terminal is located on the opened-portion side;

charging molten resin in the opened portion so that the opened portion is sealed with the resin while an opening which corresponds to the external connection terminal is formed; and curing the charged resin to seal up the opened portion of the outer packaging case.

3. A method for forming an outer packaging body of a product, the method comprising:

forming an intermediate product by combining together a plurality of constituent elements, followed by providing an external connection terminal on an outer surface of the combined elements;

inserting the intermediate product in an outer packaging case having an opening formed thereon at a position corresponding to the external connection terminal and having an opened portion pointing to a given direction, from the opened portion;

charging molten resin in the opened portion; and curing the charged resin to seal up the opened portion of the outer packaging case.

4. The method for forming an outer packaging body of a product according to claim 1, wherein the resin is a polyamide-base resin or a polyurethane-base resin.

5. The method for forming an outer packaging body of a product according to claim 1, wherein the resin is so controlled that its hardness is kept low after curing.

6. The method for forming an outer packaging body of a product according to claim 1, wherein the product is a battery pack constructed by integrally combining the rechargeable battery and a circuit board, the circuit board being designed to constitute the battery protective circuit, and incorporating a plurality of input-output terminals.

7. The method for forming an outer packaging body of a product according to claim 2, wherein the resin is a polyamide-base resin or a polyurethane-base resin.

8. The method for forming an outer packaging body of a product according to claim 3, wherein the resin is a polyamide-base resin or a polyurethane-base resin.

9. The method for forming an outer packaging body of a product according to claim 2, wherein the resin is so controlled that its hardness is kept low after curing.

10. The method for forming an outer packaging body of a product according to claim 3, wherein the resin is so controlled that its hardness is kept low after curing.

11. The method for forming an outer packaging body of a product according to claim 2, wherein the product is a battery pack constructed by integrally combining a rechargeable battery and a circuit board, the circuit board being designed to constitute a battery protective circuit for protecting the rechargeable battery from overcharging, overdischarging, and incorporating a plurality of input-output terminals.

12. The method for forming an outer packaging body of a product according to claim 3, wherein the product is a battery pack constructed by integrally combining a rechargeable battery and a circuit board, the circuit board being designed to constitute a battery protective circuit for protecting the rechargeable battery from overcharging, overdischarging, and incorporating a plurality of input-output terminals.

* * * * *